(12) United States Patent
Alarabi

(10) Patent No.: US 9,811,692 B2
(45) Date of Patent: Nov. 7, 2017

(54) SECURITY AND PROTECTION DEVICE AND METHODOLOGY

(71) Applicant: Sahal Alarabi, San Mateo, CA (US)

(72) Inventor: Sahal Alarabi, San Mateo, CA (US)

( * ) Notice: Subject to any disclaimer, the term of this patent is extended or adjusted under 35 U.S.C. 154(b) by 0 days.

(21) Appl. No.: 15/183,836

(22) Filed: Jun. 16, 2016

(65) Prior Publication Data

US 2016/0292464 A1    Oct. 6, 2016

Related U.S. Application Data

(63) Continuation of application No. 14/275,617, filed on May 12, 2014.

(51) Int. Cl.
| | |
|---|---|
| *G06F 21/88* | (2013.01) |
| *H04L 29/06* | (2006.01) |
| *H04W 12/12* | (2009.01) |
| *G06F 21/71* | (2013.01) |
| *H04W 12/08* | (2009.01) |

(52) U.S. Cl.
CPC ............ *G06F 21/88* (2013.01); *G06F 21/71* (2013.01); *H04L 63/0876* (2013.01); *H04L 63/107* (2013.01); *H04L 63/1433* (2013.01); *H04W 12/08* (2013.01); *H04W 12/12* (2013.01); *G06F 2221/2101* (2013.01); *G06F 2221/2111* (2013.01)

(58) Field of Classification Search
CPC .. G06F 21/88; G06F 21/71; G06F 2221/2101; G06F 2221/21111; H04L 63/107; H04L 63/1433; H04L 63/0876; H04W 12/08; H04W 12/12

USPC .......... 726/25; 713/190, 189, 193, 168, 156, 713/164, 171, 300; 725/25
See application file for complete search history.

(56) References Cited

U.S. PATENT DOCUMENTS

| | | |
|---|---|---|
| 8,279,065 B2 | 10/2012 | Butler et al. |
| 8,351,895 B2 | 1/2013 | Penix et al. |
| 2009/0233623 A1 | 9/2009 | Johnson |
| 2012/0046807 A1 | 2/2012 | Ruther et al. |
| 2012/0237908 A1 | 9/2012 | Fitzgerald et al. |
| 2013/0137376 A1* | 5/2013 | Fitzgerald ............ H04B 5/0056 455/41.3 |
| 2013/0152196 A1 | 6/2013 | Garg et al. |

(Continued)

FOREIGN PATENT DOCUMENTS

| | | |
|---|---|---|
| GB | 2 444 523 A | 6/2008 |
| WO | WO 2013/095590 A1 | 6/2013 |

*Primary Examiner* — William B Jones
(74) *Attorney, Agent, or Firm* — Oblon, McClelland, Maier & Neustadt, L.L.P.

(57) ABSTRACT

A mobile device includes a security device. The security device determines whether the mobile device is inside or outside security zones defined around a device being carried around by a user and an access point disposed at or near a place where the user regularly visit by detecting presence or absence of the wireless connection therewith. The device further determines whether or not there is an ongoing scheduled event and whether the mobile device is at or near an event location. The device further assesses a risk level of an environment where the mobile device is currently disposed based on determination results, and executes one of preset security action controls in response to the risk level determined to allow the mobile device to perform a security action to alert the user.

20 Claims, 14 Drawing Sheets

(56) References Cited

U.S. PATENT DOCUMENTS

2014/0172759 A1 6/2014 Klinnert et al.
2015/0067865 A1* 3/2015 Seacat Deluca ...... G06F 21/554
 726/25

* cited by examiner

| Monitoring Item | Current Value |
|---|---|
| Schedule | No Event |
| BT zone | Inside |
| WF zone | Outside |
| Risk Level | Low |

*Fig. 4*

| Device | Name | Passkey/SSID |
|---|---|---|
| Bluetooth Device | My phone | ABC... |
| | My headset | 0000 |
| | : | : |
| Wi-Fi Access Point | Office | EFG123... |
| | Coffee shop | XYZ456... |
| | : | : |

*Fig. 5*

| Risk Level | Schedule | BT Zone | WF Zone |
|---|---|---|---|
| Low | X | Inside | X |
| | Ongoing Event | X | X |
| Middle | No Event | Outside | Inside |
| High | No Event | Outside | Outside |

X: Not Considered

*Fig. 6A*

| RISK LEVEL | ACCELEROMETER | GPS | EXTERNAL COMMUNICATIONS | SENSORS |
|---|---|---|---|---|
| HIGH | ✓ | ✓ | ✓ | ✓ |
| HIGH/MEDIUM | | ✓ | ✓ | ✓ |
| HIGH/MEDIUM | | ✓ | ✓ | |
| MEDIUM | | ✓ | | ✓ |
| MEDIUM | | | ✓ | ✓ |
| MEDIUM | | ✓ | | |
| MEDIUM/LOW | ✓ | | | ✓ |
| LOW | ✓ | | | |

*Fig. 6B*

| Risk Level Change | Security Action |
|---|---|
| Low → Mid | Alert |
| Mid → High | Lock + Alarm |
| Low → High | Lock + Alarm |

*Fig. 7*

| Location | Available Connection |
|---|---|
| Meeting Room A | WiFi SSID: AB12... |
| | BT Device Passkey: 123... |
| Restaurant | WiFi SSID: XY89... |
| ⋮ | ⋮ |

*Fig. 9*

SECURITY AND PROTECTION DEVICE AND METHODOLOGY

CROSS-REFERENCE TO RELATED APPLICATIONS

This application is a continuation of and claims the benefit of priority under 35 U.S.C. §120 from U.S. application Ser. No. 14/275,617, filed May 12, 2014, the entire contents of which are incorporated herein by reference.

GRANT OF NON-EXCLUSIVE RIGHT

This application was prepared with financial support from the Saudi Arabian Cultural Mission, and in consideration therefore the present inventor has granted. The Kingdom of Saudi Arabia a non-exclusive right to practice the present invention.

FIELD OF THE DISCLOSURE

This disclosure relates to security devices and methods for protecting a wireless-enabled mobile device against theft, hacking or misplacement.

BACKGROUND

Recently, smaller and light-weight computers equipped with wireless communication capability such as laptop computers and tablet computers are gaining popularity, and more users regularly carry around such computers as well as smartphones and mobile phones. In this disclosure, such computers, smartphones, wearable devices, Internet of Things devices and the like are collectively referred to as mobile devices.

Because of their portability, the mobile devices are more vulnerable to theft, protection of data and security concerns, or likely to be misplaced when they are being used away from home. Typically, the mobile devices contain, despite their various sizes, a variety of information and data, and often contain personal and valuable information. Thus, when such mobile devices are stolen or lost, serious harm may occur. Recently, a user often carries two or more of such mobile devices. Further, the increase in valuable information stored on such devices increases the risk that they will be the object of attack by various malicious entities.

In view of the above, it is desirable to provide an security and protection system and method capable of protecting mobile devices against theft and security concerns while also preventing them from being misplaced.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

Securing a variety of mobile systems is a daunting task and not much consideration has been given to the wide variety of capacities, constraints and tasks of which a variety of mobile devices such as PCs, wearable computers, drones and so called "internet of things" devices are made for. Accordingly, until now not much thoughts has been made with respect to the synergy between all or some of these mobile systems in the context of protection and security systems. However, a system adapted to utilize the synergy between various mobile devices can provide enhanced security and protection paradigms.

According to embodiments of the present disclosure, a security device and security method are provided. The security device and method may apply to protect mobile devices with wireless connection capability against theft, hacking or misplacement.

In one aspect, the security device includes a security processor coupled to a mobile device and configured to control part of the mobile device capability to perform a security process for protecting the mobile device against theft, hacking or misplacement; and a security data memory configured to retain data to be used in the security process.

The mobile device is capable of setting up a plurality of wireless connections with wireless-enabled devices and includes a memory to retain schedule data indicative of times and locations of user events.

The security data memory retains a friendly device table that lists preselected wireless-enabled devices around which security zones are defined. The preselected wireless-enabled devices can include at least one wireless-enabled device being carried around by a user and one wireless-enabled device disposed at or near a user residence. The security data memory further retains an event location table that lists event locations and corresponding wireless-enabled devices disposed at or near the event locations. In selected embodiments, the device table may be updated based on additional security functions described herein and therefore can have a dynamic quality.

The security process includes: determining whether the mobile device is inside or outside a security zone defined around each wireless-enabled device by the detecting presence or absence of wireless connection therewith; determining whether or not there is an ongoing event by referring to the schedule data, and whether the mobile device is at or near an event location of the ongoing event by referring to the event location table and detecting presence or absence of wireless connection with the wireless-enabled device corresponding to the event location; assessing a risk level of an environment where the mobile device is currently disposed based on determination results; and executing one of preset security action controls in response to the risk level determined.

In another aspect, a self-contained security device is provided. The device may be attached to a mobile device for protecting against theft, hacking or misplacement. The device includes a security processor, a security data memory, an alert mechanism, and a plurality of wireless communication modules.

The security data memory retains: schedule data indicative of times and locations of user events; a friendly device table that lists preselected wireless-enabled devices around which security zones are defined, the preselected wireless-enabled devices including at least one wireless-enabled device being carried around by a user and one wireless-enabled device disposed at or near a user residence; and an event location table that lists event locations and corresponding wireless-enabled devices disposed at or near the event locations.

The security processor may perform the same or similar security process employed at the foregoing security device. The alert mechanism performs an alert action in response to the security action control.

In still another aspect, the security method includes retaining: schedule data indicative of times and locations of user events; a friendly device table that lists preselected wireless-enabled devices around which security zones are defined, the preselected wireless-enabled devices including at least one wireless-enabled device being carried around by a user and one wireless-enabled device disposed at or near a user residence; and an event location table that lists event locations and corresponding wireless-enabled devices disposed at or near the event locations.

The method further includes: determining whether the mobile device is inside or outside a security zone defined around each preselected wireless-enabled device by detecting presence or absence of wireless connection therewith; determining whether or not there is an ongoing event by referring to the schedule data, and whether the mobile device is at or near an event location of the ongoing event by referring to the event location table and detecting presence or absence of wireless connection with the wireless-enabled device corresponding to the event location; assessing a risk level of an environment where the mobile device is currently disposed based on determination results; and executing one of preset security action controls in response to the risk level determined.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 is an example of a wireless profile table describing current statuses of wireless environment signatures and an assessed risk level;

FIG. 5 is an example of a friendly device table that lists friendly wireless-enabled devices considered to be disposed at or near safer areas;

FIG. 6A is an example of a risk level assessment table describing a risk level assessment scheme;

FIG. 6B is an example of an additional risk assessment table that can be used in addition to or alternatively from the risk assessment table described with respect to FIG. 6A according to one example;

FIG. 7 is an example of a security action table defining security action controls in response to risk level changes;

FIG. 9 is an example of an event location table that lists event location candidates and available wireless connections;

DETAILED DESCRIPTION OF THE EMBODIMENTS

Figure 1:
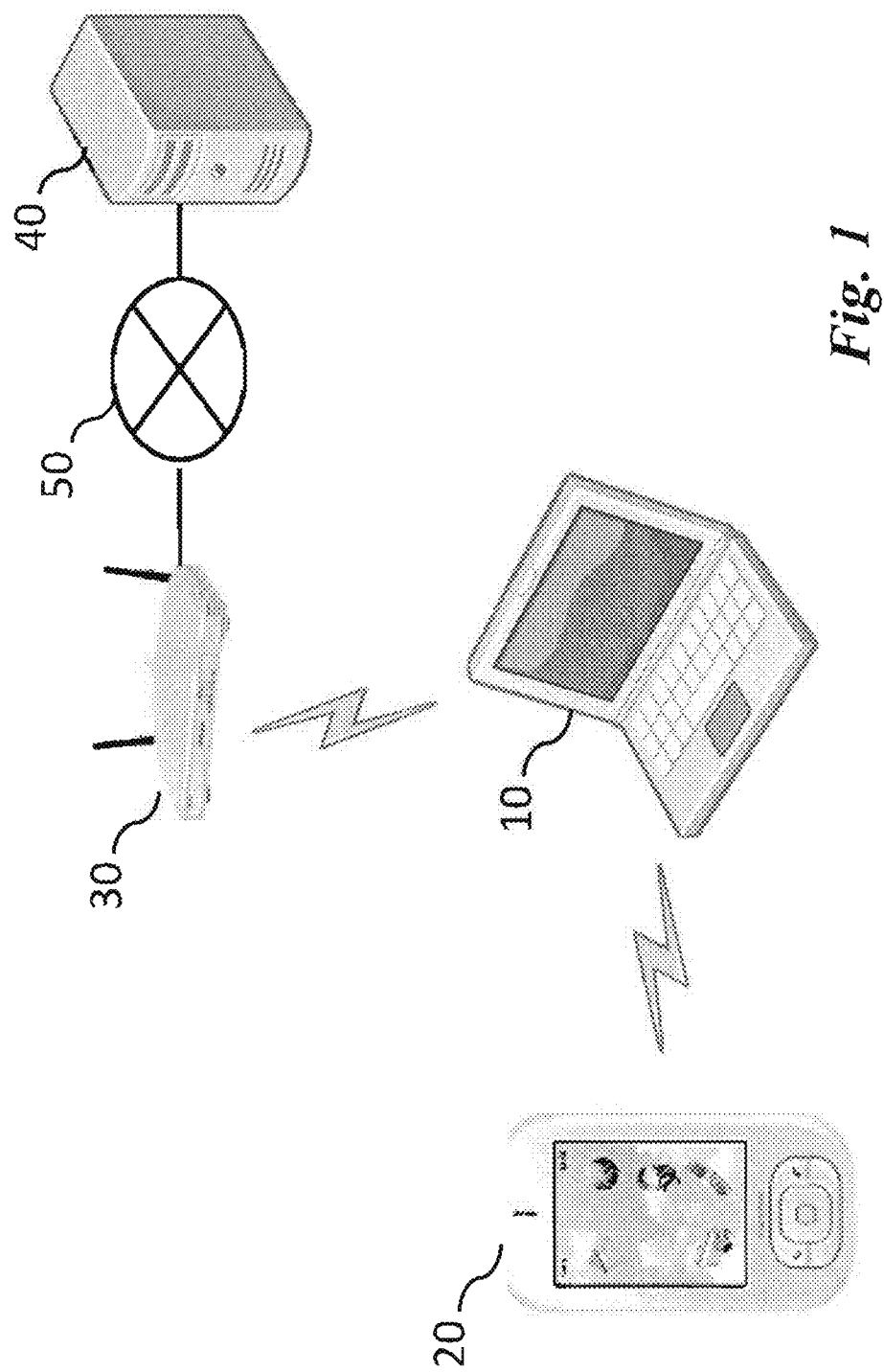
FIG. 1 is a schematic diagram illustrating a mobile device including a security device according to one embodiment in an exemplary environment.

Referring now to the drawings, wherein like reference numerals designate identical or corresponding parts throughout the several views.

FIG. 1 is a schematic diagram illustrating a mobile device 10 according to one embodiment of the present disclosure in an exemplary environment. The mobile device 10 includes a security device configured to carry out a security process to implement a security program of the present embodiment.

In FIG. 1, the mobile device 10 is in communication with a device 20 via a first type wireless connection and an access point 30 via a second type wireless connection. The access point 30 is connected to a server 40 via a network 50.

The mobile device 10 is provided with wireless connection capability that enables to set up a plurality of wireless connections with a plurality of wireless-enabled devices concurrently as would be understood by one of ordinary skill in the art. The mobile device 10 may be, for example, but not limited to, a laptop computer, a tablet computer, a smart phone, a game machine, an automobile, unmanned aerial vehicle, wearable device and Internet of Things device.

The device 20 is provided with at least the first type wireless connection capability, and may be, for example, but not limited to, a mobile phone, a smart phone, a game machine, a laptop computer, a tablet computer, a wireless headset, a wireless keyboard, a wireless speaker.

The access point 30 may be any access point that provides a wireless LAN service using the second type wireless connection. The access point 30 may alternatively be, for example, but not limited to, a wireless router, repeater, or range extender.

In the security process, the device 20 and the access point 30 are used as reference points to establish security zones. The security zone corresponds to a wireless communication range with each reference point. The security zones may overlap or separate from each other depending on spatial relationships between the reference points and the mobile device 10.

In the present embodiment, the security zone is defined as an area where the mobile device 10 is expected to be found in a typical use or a user's regular daily schedule. For example, the areas may include, but not limited to, a close vicinity of a user, a user's home, and a user's work place. The reference points are selected in such a way that the mobile device 10 may always stay inside at least one of the security zones in a typical use or a user's regular daily schedule. For example, a security zone around a user may be established when a device being carried around by the user is used as the reference point. A security zone around a user's home may be established when a wireless router installed at the user's home is used as the reference point. In the following description, such preselected reference points are also referred to as friendly wireless-enabled devices.

Once the security zones are established, the security process monitors statuses of the wireless connections to determine whether the mobile device 10 is inside or outside the respective security zones.

As long as the mobile device 10 stays inside any one of the security zones, it may be generally considered the mobile device 10 is safe and not stolen. In contrast, a breach of security zones means deviation of the mobile device 10 from the typical use or the user's daily schedule. For example, it may mean that the mobile device 10 is left alone at an unfamiliar place or being stolen. Sequential breaches of security zones or a breach of plural security zones may indicate that stealing of the mobile device 10 is in progress or the mobile device 10 is being carried away by someone by mistake. Upon detecting the breach of security zone, one or more security actions are triggered depending on the type of breach.

In FIG. 1, the first type wireless connection and the second type wireless connection are different in communication range, and thus produce security zones different in size. The number of the wireless connections to be set concurrently and the number of the wireless connection type to be used are not limited to those illustrated in FIG. 1. In some embodiments, three or more concurrent wireless connections or three or more wireless connection types may be employed to establish plural layers of security zones.

In the following description, it is assumed the mobile device 10 is a laptop computer, the device 20 is a smartphone that a user typically carries, and the mobile device 10 and the device 20 are wirelessly connected via a Bluetooth (Registered Trademark) connection. Further, it is also assumed that the access point 30 is fixed at a certain location and provides a wireless connection to a Wi-Fi (Registered Trademark) network.

In some embodiments, other wireless communication techniques such as near field communications and GPS may be alternatively or additionally used to establish security zones. When the near field communications is employed, an established security zone may be much smaller in size compared to the cases with other wireless communication types. This is useful to detect even a small change in position occurred at the mobile device 10. When GPS is used, the security zone may be established to cover any preset geographical area such as an office building.

In some embodiments, other information from sensors available on the mobile device 10 such as accelerometer information, microphone information, camera information, and local area crime notifications may be additionally used to establish security zones. For example, if a microphone on the mobile device 10 detects a certain volume of noise, this information may be used in conjunction with BT, WF, or GPS data to assess the risk level of a given environment. Additional sensor information can include motion, speed, temperature, pressure, wireless signal values, magnetic properties and visual or audible sensor values.

Further, a security zone may alternatively be established so as to cover a group of areas where a user regularly travels or visits in his/her regular daily schedule. For example, a stretch of area from a user home to a work place via a commuting route may be defined as the security zone. In this case, wireless-enabled devices included in the group of areas may be used as the reference points to form a composite security zone to cover the group of areas. For example, iBeacons™ of Apple™ corporation could be paired with or wireless devices from neighboring buildings on the route.

In another embodiment, security zones may use probabilistic learning to further refine the risk level of a given environment. For example, the mobile device 10 may detect a device 20 and access point 30 that are present in an established security zone on a recurring basis that have not been designated as security zone reference points. As the frequency of detection of this device 20 and access point 30 increases within a security zone, they can become recognized as security zone reference points. Further, in selected embodiments, risk assessments can be made based on the quantity of recognized environment variables, such as the sensor data, as well as the reliability of such variables in conjunction with position information as described further herein.

Figure 2:
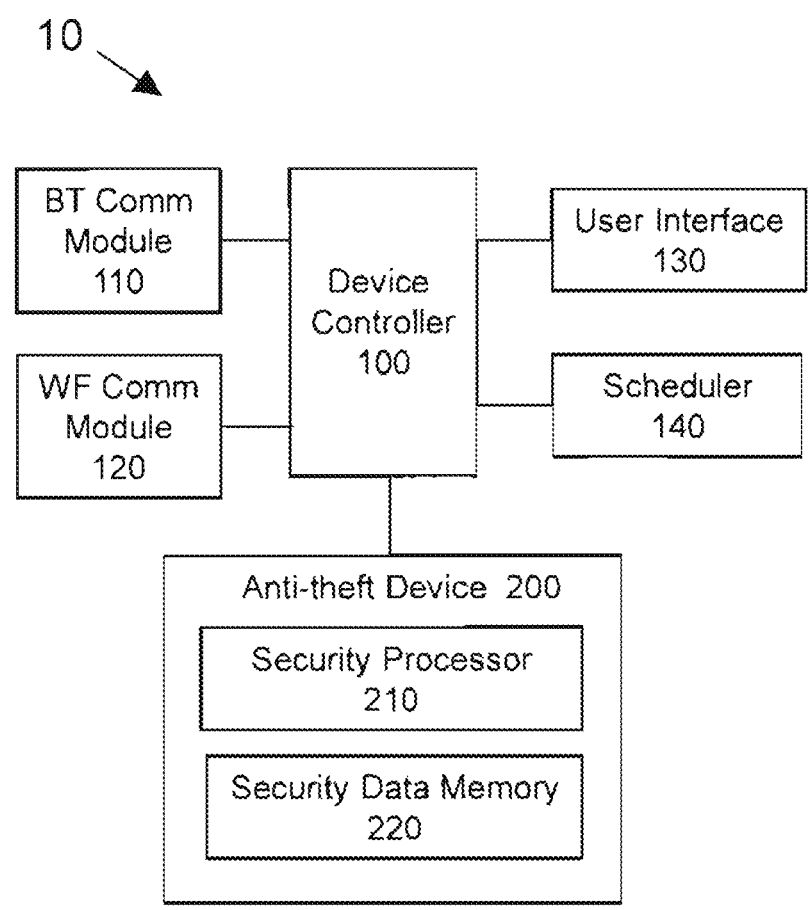
FIG. 2 is an exemplary schematic block diagram of the mobile device including an security device.

FIG. 2 is a schematic block diagram of the mobile device 10, and illustrates only components relating to the security process. In FIG. 2, the mobile device 10 includes a device controller 100, a BT communication module 110, a WF communication module 120, a user interface 130, a scheduler 140, and a security device 200. The security device (also referred to herein as anti-theft device) 200 includes a security processor 210 and a security data memory 220.

The device controller 100 controls operations of respective components of the mobile device 10 as would be understood by one of ordinary skill in the art.

The BT communication module 110 discovers a wireless-enabled device available for pairing, and automatically sets up a Bluetooth connection to a paired device when a bond with the device is formed in advance. The BT communication module 110 maintains the Bluetooth connection until the paired device moves out the communication range.

The WF communication module 120 automatically sets up a wireless connection to preselected Wi-Fi networks through wireless access points, routers, repeaters, range extenders, or the like.

The user interface 130 may include, for example, a keyboard, a touch-pad, a microphone, a speaker, a display, a touch-panel, and the like.

The scheduler 140 is a software product that allows a user to enter times and places of events the user intends to attend or participate. Information regarding the times and places of events is retained as schedule data in a memory section of the scheduler 140.

The security device 200 communicates with the components 110, 120, 130, and 140 through the device controller 100 to perform the security process.

The security processor 210 control part of the mobile device 10 performs the security process. The security process includes, but is not limited to, a control process and three sub-processes, a schedule monitoring process, a BT zone monitoring process, and a WF zone monitoring process. The processes will be described in detail below with reference to drawings.

The security data memory 220 stores data used in the security process. Such data includes a wireless profile table, a friendly device table, a risk level assessment table, a security action table, an event location table, and a security action log. The data will be described in detail below with reference to drawings.

In FIG. 2, the BT communication module 110 and the WF communication module 120 may be general-purpose network interface controllers for setting up wireless connections to communicate with Bluetooth-enabled devices and Wi-Fi access points.

In some embodiments, the security device 200 may include its own BT and WF communication modules for use in the security process or may be mobile device running an application via memory and processing to perform the security methods described herein. In this case, the security device 200 may be formed as an independent device that can be retrofitted or connected to a mobile device to be protected through a USB port, for example.

Alternatively, the security device may be formed as a self-contained device. Such a device may be provided with its own wireless connection capability and an alerting mechanism. The device may be simply attached to a mobile device to be protected.

Figure 3:
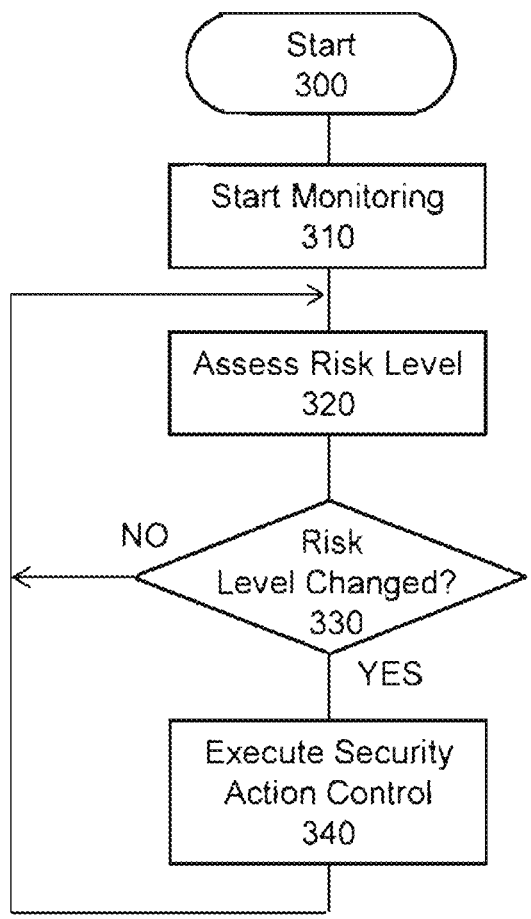
FIG. 3 is an exemplary flowchart of security process for implementing a security method according to one embodiment.

FIG. 3 is an exemplary flowchart of the control process of the security process. The control process starts when the mobile device 10 is powered on.

At step 310, the sub-processes are initiated for checking the schedule data for an ongoing event and monitoring a status of each wireless connection.

These monitoring processes may be executed concurrently or consecutively. The operation of each monitoring process is repeated at a given cycle and keeps providing an updated monitoring result until the mobile device 10 is powered off. It is preferable to continue the monitoring processes even when the mobile device is not used or in a sleeping mode or even after the mobile device is locked as a result of a security action control, which will be described in detail below.

In another embodiment, the number of concurrent monitoring processes being executed can vary depending on factors such as a device's available battery life, the amount of available processing power on a device, the risk level of the current environment, the fidelity of a sensor being used for a monitoring process in a given environment and power consumption values of each sensor in general or in calculated conditions. This data can be gathered and used in conjunction with other data when determining risk scenarios as described further herein.

In the present embodiment, the schedule monitoring process, the BT zone monitoring process, and the WF zone monitoring process are used as the sub-processes.

At step 320, the risk level of an environment where the mobile device 10 is currently placed is assessed based on monitoring results by using a preset risk level assessment table. Alternatively, or in addition to, in selected embodiments the security device 200 can retrieve and identify data that may affect the current calculation of the mobile device's risk level. As noted above, this information can be determined from a variety of sources of the mobile device and may also be determined based signal strength or reliability levels of the data as determined by for example hash comparisons.

At step 330, the risk level thus assessed is compared with a previous risk level obtained in the last process cycle to determine whether or not the risk level changes. When a change in risk level is detected (Yes at step 330), the process proceeds to step 340. When a change in risk level is not detected (No at step 330), the process returns to step 320.

At step 340, one of preset security action controls that correspond to the detected risk level changes is executed, and the process returns to step 320.

FIG. 4 depicts an example of the wireless profile table retained in the security data memory 220 of FIG. 2. The wireless profile table in FIG. 4 includes latest values of the monitored items and the assessment result. In the present embodiment, the monitoring processes determine the presence or absence of an ongoing event, the position (inside or outside) of the mobile device 10 with respect to a BT zone, and the position (inside or outside) of the mobile device 10 with respect to a WF zone.

In selected embodiments, a server, such as server 40, can also be used as a paired device in addition to the BT and WF to determine an additional security zone via communication through BT, WF, 3G/4G or any other communication with the server 40. For example, a server zone could be established merely by connecting the mobile device 10 to the server via the above-noted processes. Once this connection is established it represents another security zone in addition to the BT and WF security zones. The server security zone can be used similarly to that of the BT zone and WF zone but acts as an overall safeguard in case no other zones are created via a mobile device 10 pairing.

The BT zone corresponds to the communication range of a Bluetooth connection with a paired device such as the device 20 in FIG. 1. The WF zone corresponds to the communication range of a Wi-Fi connection with a wireless access point such as the access point 30 in FIG. 1. In other words, the BT zone and the WF zone are security zones established around the reference points that communicate with the mobile device 10 via the Bluetooth connection and the Wi-Fi connection, respectively.

The wireless profile table in FIG. 4 indicates that there is no ongoing event, the mobile device 10 is inside a BT zone but outside a WF zone, and the risk level of an environment where the mobile device 10 is currently placed is low.

The wireless profile table enables to describe a current environment where the mobile device 10 is placed in term of the BT zone and the WF zone spacewise and the scheduled event timewise.

FIG. 5 is an example of the friendly device table that lists friendly Bluetooth-enabled devices and friendly Wi-Fi access points with which wireless connections are allowed to be set up automatically. In FIG. 5, the friendly Bluetooth-enabled devices include "my phone", "my headset", and the like, which are most likely to be carried around by a user. The friendly Wi-Fi access points includes access points, routers, or any other similar devices installed at work, a coffee shop, and the like, where a user regularly visits and considered to be safe places.

In the present embodiment, for purpose of the security process, the BT zone and the WF zone are automatically established only around preselected "friendly" reference points, where the risk level is considered to be lower. For example, Bluetooth connections are automatically set up only with Bluetooth-enabled devices closely related to a user, such as a smart phone, a cell phone, a wireless headset, and the like, which are most likely to be carried around by a user all the time. In other words, when the mobile device 10 is close to one of the friendly Bluetooth-enabled devices, it is highly possible that the mobile device 10 is being near a user. When the mobile device 10 is near a user, it may be considered the risk level is the lowest.

Similarly, Wi-Fi connection is automatically set up only with friendly Wi-Fi access points, positions of which are known in advance and areas nearby are considered to be safe places. For example, access points at work and access points installed at places where a user regularly visits such as a coffee shop may be considered to be a safe place.

In addition to the foregoing friendly devices and access points, any other wireless-enabled devices may also be used to establish a security zone automatically as long as the security zone is known to a user and accepted as a safe place. For example, another wireless-enabled device including the same security device may also be used to establish a security zone, for such a device may be considered to be reliable and disposed at a safe place. Further, unknown security devices could be used to establish a security zone and could be manually assigned by the user or preset by the user therefore preventing any automatic connection with an unknown wireless device.

FIG. 6A is an example of the risk level assessment table retained in the security data memory 220 of FIG. 2. In the present embodiment, the risk revel is assessed by use of the risk level assessment table such as illustrated in FIG. 6A. This table describes possible combinations of the monitored item values and corresponding risk levels. In the assessment of risk level at step 320 of FIG. 3, the values of the three monitored items stored in the wireless profile table of FIG. 4 are obtained, and a risk level value corresponding to a combination of the obtained latest values is determined from the risk level assessment table. The risk level thus determined is stored in the bottom of the wireless profile table in FIG. 4.

In FIG. 6A, the risk level is determined to be the lowest when the mobile device 10 is inside a BT zone or when there is an ongoing scheduled event and the mobile device 10 is at or near an event location. Here, a letter "X" in FIG. 6A means that the value of the monitored item is not considered.

In other words, in the present embodiment, the risk level is considered to be the lowest whenever the mobile device 10 is close to one of the friendly Bluetooth-enabled devices listed in the friendly device table of FIG. 5 or whenever the mobile device 10 is at the ongoing event location.

The risk level is considered to be middle when the mobile device 10 is outside the BT zone but inside the WF zone and when no event is scheduled. Since the WF zone is established around one of the friendly Wi-Fi access points listed in the friendly device table of FIG. 5, it is considered the mobile device 10 is not at immediate risk. However, the risk level is higher compared with the foregoing environment, for the mobile device 10 is outside the BT zone and a user is not present in the close vicinity.

The risk level is considered to the highest when the mobile device 10 is outside both the BT zone and the WF zone and there is no ongoing scheduled event. This may mean that the mobile device 10 is stolen or lost, and it is preferable to taken an immediate action.

It should be noted that the risk level assessment table in FIG. 6A is one example, and any other assessment scheme may be adopted in assessing the risk level. For example, four or more risk levels may be alternatively used to assess the risk level of an environment where the mobile device 10 is placed such as when a server security.

Alternatively, in addition to the event schedule, two or more BT zones and/or WF zones may be established and monitored to assess the risk level and a server zone may be used to provide additional risk setting levels such that if there are no other zones established a risk level could be medium or high if outside the server zone. Here, outside the server zone would represent that the mobile device 10 is no longer paired or sending or receiving signals to and from the server. If a BT zone or WF zone are established and the mobile device 10 is inside either one, the risk level may be low even if the mobile device is outside the server zone.

FIG. 6B provides an additional risk assessment table that can be used in addition to or alternatively from the risk assessment table described with respect to FIG. 6A. This risk table, as with the risk table in FIG. 6A can be developed dynamically over time and based on user, mobile device and environment variables. In FIG. 6B, a plurality of additional variables to be considered when assessing risk are illustrated as being included in a table stored in the security data memory 220 of FIG. 2, or externally on the server 40. However, other memory configurations within the security device 10 are contemplated as would be understood by one of ordinary skill in the art. FIG. 6B illustrates a plurality of risk levels determined based on the state of information processed by the security device 200. Exemplary security levels include a low security level, a medium/low security level, a medium security level, a high/medium security level and a high security level, although other security schemes are contemplated as would be understood by one of ordinary skill in the art. As illustrated in FIG. 6B and described further below, a check mark illustrates that information has been received and/or processed by the security device 200 which indicates that there is some type of concern with the data as it could indicate danger to the mobile device 10 or other devices.

Current smart devices use a plurality of sensors for the every-day functionality of the device itself. For example, many smart devices employ an accelerometer to identify movement and spatial orientation of the smart device. GPS is further used to identify the location of the smart device based on signal transmission of the smart device. Smart devices may also include a plurality of bio-sensors such as detecting heartbeat, the rate of breathing, a level of perspiration, as well as the detection of sound of the external environment and video collection of the external environment as would be heard or seen by a user of the smart device. These are examples and other types of sensors of a smart device could be used in the risk assessment as described further herein.

The accelerometer sensor can provide a wealth of information to the security device 200 from which the security device 200 can determine certain risk assessments. For example, the accelerometer can detect whether the phone is shaking more than a predetermine safe amount which may indicate that someone is being robbed and is nervous or perhaps that the mobile device 10 is stolen and the thief is running away or that the owner of the mobile device 10 is running away from a thief. Detecting a constant spatial reorientation of the device above a predetermined amount could also be indicative of a dangerous situation.

The GPS provided with the mobile device 10 can also provide a wealth of information to the security device 200. For example, the GPS can determine whether the owner of the mobile device 10 is within a predetermined safe zone or a zone in which the user typically resides in on a periodic basis. For example, if the owner of the mobile device 10 is a student and a GPS reading indicates that the owner is located on campus then this reading can be used by the security device 200 to determine a lower risk rating as the user is likely performing his normal daily routine. This information could be combined with time information to further refine the process of risk assessment by the security device 200. For example, the security device 200 could determine specific times at which the owner of the mobile device 10 is typically on campus and compare those times to a reading of when the GPS detects that the user is on or off campus. Environmental sensors, or bio-sensors, can also be used in conjunction with these readings to confirm that the mobile device 10 is actually located in a safe zone (campus) such as a temperature setting and/or image analysis as further described below.

Bio-sensors on the phone can also provide additional information from which the security device 200 can determine a risk level with respect to the owner, the owner's valuables and the mobile device 10. Bio-sensors could detect a highly elevated rate of breathing which may indicate that the owner of the mobile device 10 is nervous or in a dangerous situation. This sensor could be used in coordination with the accelerometer to determine the movement of the user and to further refine the risk level assessment. For example, if the user has an elevated heart rate but the accelerometer detects a lot of movement then it may be determined that the user is just exercising. However, the user could be running from a dangerous situation and therefore the GPS signal could also be used to determine a route of where the user is located such that a determination can be made as to whether the user is on a typical exercise route or in a potentially dangerous or uncharted area for the user. Bio-sensors detecting the level of perspiration could also be indicative of a high-risk situation in which the user is extremely nervous or scared. Again, this reading could be clarified by including readings from other sensors such as the accelerometer to detect movement, a temperature sensor to determine the heat and/or humidity levels and/or a GPS sensor to determine the location of the user of the mobile device 10 such that a determination as to the weather in that location could be made. If the security device 200 determines that it is very cold in the area in which the user is located, via GPS or a temperature sensor for example, and the user still is perspiring more than a predetermined amount, then the level of risk may be determined and/or elevated. Additional sensors that could be employed include but are not limited to pressure sensors, magnetic sensors, power sensors, gas sensors, and the like.

Sound and video sensors can also be used to determine a risk level based on what is detected by these sensors and processed by the security device 200. For example, a sound sensor may detect raised vocal levels, such as shouting, which may indicate that the owner of the mobile device 10 is being harassed or attacked. Sound processing and filtering technologies could also be implemented to determine whether the voice which is shouting is the owner of the mobile device, a pre-known voice of a contact with the mobile device's phone book, or a stranger. Certain vocal patterns such as screaming, by the user or another, could also be identified and processed by the security device 200 as an increased risk level. Video or pictures captured by the image sensor on the mobile device can also be utilized to calculate a level of risk. For example, the camera may periodically take pictures of a surrounding environment and compare those to previously captured pictures or video or may compare the pictures to pictures stored in a database to determine whether the mobile device 10 or user are in an area in which they typically visit and has previously been determined to be safe. If the mobile device 10 is captured or the user is kidnapped then this would clearly elevate the risk level at which point an alarm could be raised as described further herein.

External communications with additional devices received by the mobile device 10 or to which the mobile device 10 has transmitted signals can also be used in the identification of the risk level. As explained previously, this may represent signals between the mobile device 10 and predetermined safe zones such as a BT zone and/or WF zone. However, it may also include communications with other devices and may be used in conjunction with other data obtained by the mobile device 10. For example, the reception level of the mobile device 10 of signals from cell towers and/or satellites may indicate a certain level of risk. If the user typically has a predetermined level of reception during his daily routine as calculated by the security device 200 and suddenly the signal becomes poor for a predetermined period of time, a risk level may be increased. This data can also be used in conjunction with other information identified by the mobile device 10. For example, the reception levels may be detected in conjunction with GPS signals such that the security device 200 determines acceptable reception levels based on the location of the owner of the mobile device 10 during their daily routine. Further, external communications from external devices, such as the server 40, can provide public and/or private data from trusted or untrusted sources to identify potential risk determination factors from various sources such as news outlets, TV/radio reports, police reports and other repositories of information. Once these security levels are determined, then the security device 200 can calculate and change the level of risk based on changes to the reception level of the mobile device 10 and based on a location of the mobile device 10.

By using a plurality of communications between various devices such as personal mobile devices, drones, cell towers, satellites, TVs, Internet of Things devices and other electronic devices with communication capabilities, the security device 200 can accurately determine a risk level or the need to change a risk level. For example, the security device 200 can identify and formulate a network of the various electronic devices which are communicating with the mobile device 10. Using this network, a shared-risk level can be determined by the security device 200 based on interactions and communications with the other electronic devices in the network. In such a shared-risk network, a change in the risk level of one device or disappearance of one device may affect the risk level of other devices in the shared-risk network.

For example, the shared-risk network may include a BT zone, one or more additional mobile devices such as cell phones, PCs, TVs and a car. To ensure that each system is compatible and can communicate with each other, the security device 200 may be programmed to include a plurality of APIs for various electronic devices. These devices may then communicate with the security device 200 via the API as would be understood by one of ordinary skill in the art. Once the shared-risk network is generated, a security level can be assessed for each device by the security device 200 or separately by the devices in the network themselves. The security levels of the various devices in the network will directly affect the security level of other devices.

Figure 6C:
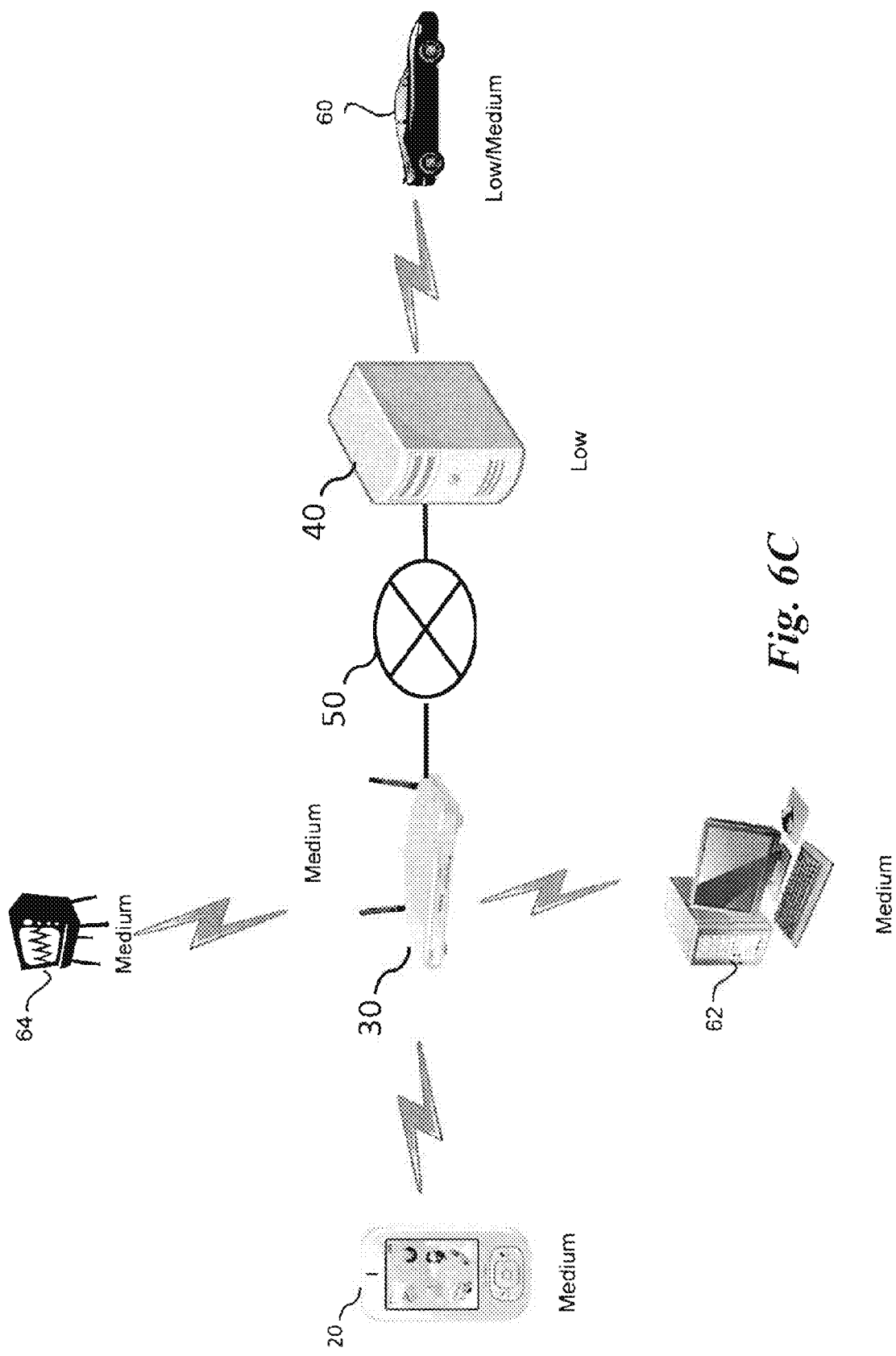
FIG. 6C illustrates a shared-risk network according to one example.

For example, FIG. 6C illustrates the shared-risk network according to one example having the mobile device 20, WF zone 30, server 40, car 60, PC 62 and TV 64. Each device in the network is assigned a risk level either by the security device 200 or by the electronic devices themselves. For example and as illustrated, the mobile device 20 has a medium risk level, the TV 64 has a medium risk level, the PC 62 has a medium risk level, the server 40 has a low risk level and the car 60 has a low/medium risk level. Therefore, FIG. 6C illustrates a snap-shot of the current risk levels assigned within the shared-risk network based on the information (discussed above) processed by the devices and/or the security device 200.

Figure 6D:
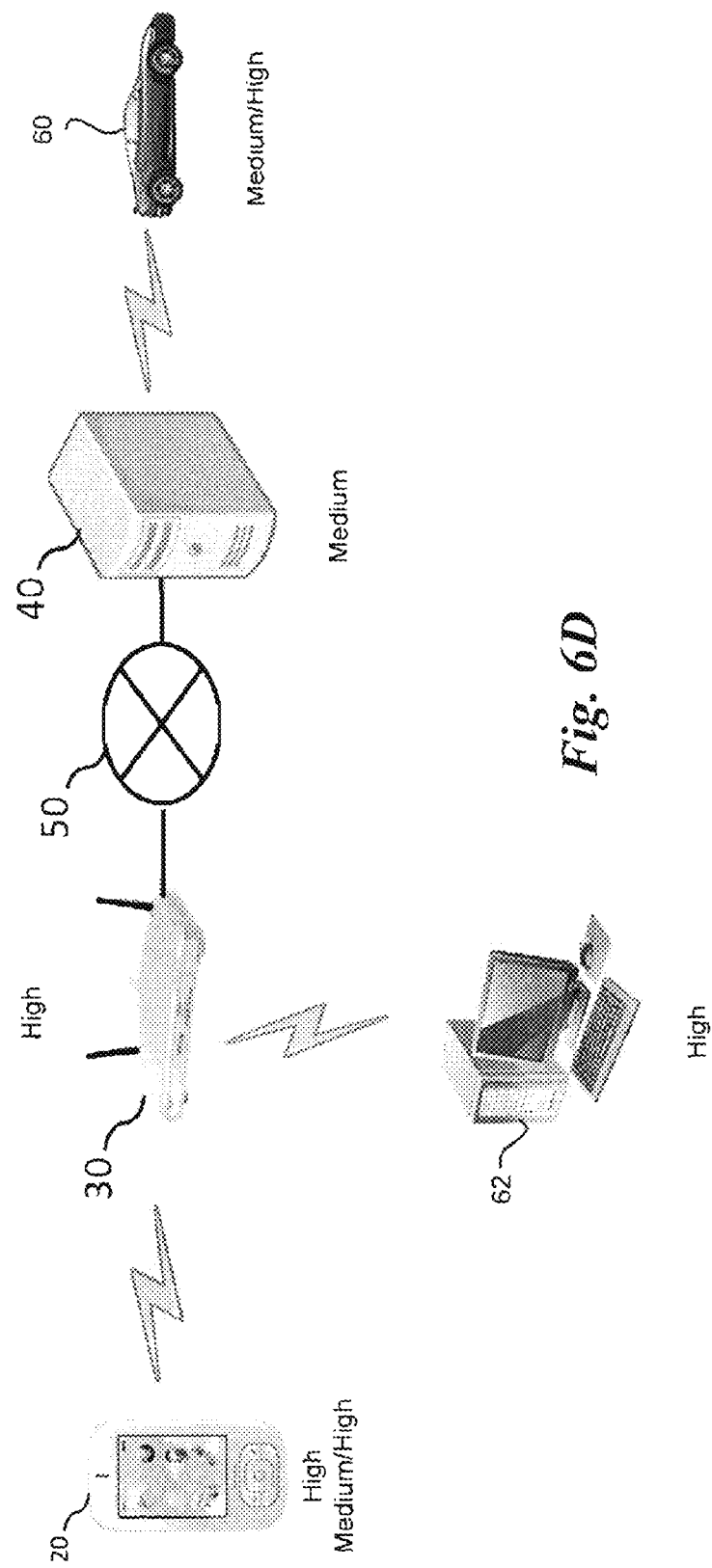
FIG. 6D illustrates the shared-risk network according to one example.

FIG. 6D illustrates a change in the security levels of the devices within the shared-risk network based on the theft of the TV 64. In FIG. 6D, the security device and/or devices have calculated new risk levels based on the theft. For example, the security risk of the PC 62 is now set to high as it is located in the same household as the TV and is therefore at extreme risk. The mobile device 20 may have a medium/high risk or high risk based on the proximity of the mobile device 20 to the TV 64. This same logic applies to the WF zone 30 router located in the household. Similarly, the car 60 may have its risk level changed from medium/low to medium or medium/high based on its proximity to the stolen TV 64. The server 40 may change its risk level from low to medium/low as there may be some concern that one of the devices connected to the server 40 has been compromised thereby placing the server at risk. In selected embodiments, other changes could include the theft of other devices, hacking of other devices and/or any other security concern determined based on the variables and information described above.

It should be noted that the mobile device 10 need not have access to all of the information described above or that all of the sensors, devices, etc be reporting constantly to the mobile device 10. Some of the sensors on the mobile device 10 for example may only be activated based on the current risk level. For example, if a risk level concern is identified and/or altered, the mobile device 10 may turn on GPS from power-saving mode to provide enhanced information thereby affording a higher accuracy with the risk level calculations. This same logic applies to the sensors on the phone which may be activated or inactivated based on the security level detected by the security device 200. A risk level that is trending in the direction of becoming more of a concern may result in the employment of additional sensors and/or external communications whereas the opposite may occur when the risk level is trending to safer levels and the resources are better used for other tasks on the device. Therefore, power on the mobile device 10 can be saved while also utilizing the required features when necessary and risk concerns elevate. Further, additional resources could be shared from other devices in the shared-risk network as required such that even more enhanced risk levels could be calculated at higher efficiency levels. The shared resources could be obtained and utilized via packet sharing and resource allocation schemes as would be understood by one of ordinary skill in the art. However, tasks executing on the various devices in the shared network may be deemed to be more important than their risk level or concerns relating thereto. For example, maybe the completion of an important calculation or processing is more important than the security concerns at that moment and therefore the resources utilized in performing the task may not be used or that device in the shared-risk network may not share its resources.

Based on the plurality of information discussed above and identified by the security device 200, the security device 200 can calculate a current risk level and/or determine that a risk level needs to be changed. This can be done in variety of ways as explained herein utilizing various risk table metrics and the combination of reports from various devices and sensors. It can also include determining a risk level by assigning each risk level to a predetermined score which is identified by adding up weighted information from various sources. Each portion of data can also be scored for its value based on the perceived accuracy of the data. The weights may be assigned based on the perceived importance of the information to calculating risk levels. For example, accelerometer data may have a lower value than data from a known safe zone such as the BT zone. In selected embodiments, the following equation could be used:

$$\text{Risk Level} = \Sigma X_1 W_{X1} + X_2 W_{X2} \ldots + X_n W_{Xn}$$

Where X is a value processed (i.e. GPS, Sensor value, signal strength, safe zone, etc) by the security device 200 and W is a weight assigned to that value based on its perceived importance. Each piece of information can also be valued differently based on its perceived accuracy as well as a weight of how valuable that piece of information is in the calculations of security risk levels.

Further, it should be noted that all of the information described above, such as risk level determinations, GPS data, bio-sensor data, mobile device 10 data, and other information used by the security device 200 to calculate and/or alter the risk level, can be saved on the mobile device 10. This information can be current information or historical information used to determine trends and/or predetermined security variables. In selected embodiments, the information may be stored in a cloud hosted by the application described herein for access by one or more mobile devices 10 which have subscription services. Alternatively, or in addition to, the information may be stored in a distributed fashion over the shared-risk network such that the various devices in the network store portions of the data for access by all of the devices within the network. This historical information can be used in a probabilistic fashion such that trends can be identified based on various environmental and location information from previous experiences. For example, if the security risk identified by the security device 200 always increases when the user travels to a particular area, this information may be highly considered when the user travels to the same location in the future or locations near that location.

Via the shared-network scheme as well as the utilization of the various information identified by the security device 200, the security device 200 can not only be protected but other devices within the shared-risk network can be protected as well. Therefore, the current system provides numerous advantages of safeguarding a variety of different electronic devices. Further, thanks to the alerts provided as described herein, the user can identify that various devices have elevated risk levels and/or have been stolen and may take appropriate actions with local law enforcement or other enforcement agencies. This lowers the risk of additional incidents while also increasing the chances of receiving the property back or getting reparations for damaged or hacked systems in a timely manner. Further, the current system also alerts users to dangers or increased security concerns thereby enabling the user or other users to take steps to better protect themselves.

With respect to alerting the user or other users, FIG. 7 is an example of the security action table stored in the security data memory 220. The security action table is used at step 340 of FIG. 3 to determine a security action control to be executed in response to the detection of risk level change.

In FIG. 7, when the risk level changes from the low level to the middle level, an alert message may be transmitted to a designated destination to inform a user of the risk level change. This class of risk level change may occur, for example, when a user leaves a desk at work where the user has been working using the mobile device 10. Here it is assumed that the user carries the device 20, and the access point 30 is installed at this work place. In this case, as the user moves away from the desk, the BT zone moves out from the mobile device 10, but the mobile device 10 stays inside the WF zone. Alert messages may also be sent to other devices located in that area that are also connected to the security system to further enhance protection policies while reducing risk. Additionally, third parties such as predetermined management profiles or authority profiles, such as the police, may be alerted by the security system to enhance protection schemes and prevent the risk of further transgression. This can include people in the immediate vicinity of where a high risk level is detected as well as owners or administrators of the various devices within the shared-risk network.

When the risk level changes from the middle level to the high level, an alarm is sounded and a system of the mobile device 10 is locked or disabled. This can also include transferring any stored content on the mobile device 10 to a predetermined storage module of the security system while also removing data on the mobile device itself and/or terminating some or all of the tasks currently being processed by the mobile device 10 such as signal emission, lighting, and data processing. This allows the user to retrieve their data while also preventing theft of any sensitive data. Specially equipped mobile devices 10 may also contain storage containers or a corrosive material that will be released to destroy the mobile device itself based on a perceived threat and risk level change. When any wireless connection is available, it is preferable to transmit an alert message to the designated destination to inform the user of this risk level change before locking the system. This class of change may occur, for example, when someone carrying no friendly Bluetooth-enabled device carries the mobile device 10 out from the WF zone. In this case, it is suspected that the mobile device 10 may be stolen or carried out by mistake, and an immediate action may be desirable.

When the risk level changes from the low level to the high level, a security action the same as in the risk level change from the middle level to the high level may be performed. This class of change may occur, for example, when a user carrying the device 20 visits a new place where no friendly wireless-enabled device is discovered, and subsequently leaves the place without the mobile device 10.

The same risk level change may also occur when the mobile device 10 is stolen and carried away from an event location or the vicinity of a user after being powered off. In such cases, the corresponding action may be performed when the mobile device 10 is powered on for the first time after being stolen.

While the above descriptions provides examples of actions to be taken based on particular changes of the security levels, it is noted that the disclosure is not limited to these features and that a combination of different security actions could be envisioned based on various changes to the security levels or that different devices may have different security levels and different security actions based on their perceived value and/or the sensitivity of data on such devices. For example, light or sound may be emitted from the mobile device 10 based on the risk level and risk level information, hacking information or theft information may be transmitted to other devices in the shared-risk network thereby providing advanced warning to owners.

Information relating to execution of the security action control may be recorded in the security action log retained at a separate device such as the server 40 or the device 20 in case the mobile device 10 is stolen or lost as well as the security data memory 220. The information may include the security action control executed, data of the wireless profile table at the time of execution, and information relating to, if applicable, the ongoing event, the BT zone, and the WF zone.

The foregoing security action controls are mere examples, and any other security action controls may alternatively be executed to suit a user's preference. For example, the security action control may be replaced by a more decisive security action control or an additional security action control may be executed when the high risk level does not returned to the middle level or the low level within a preset time period. For example, when the security level changes from the low level to the high level and this condition persists more than a preset period of time, the mobile device 10 may be powered down.

Further different types of actions can be taken in the context of a security action control such as emitting an alarm via a speaker or light from the mobile device 10 depending on the security level such as for all security levels. If the user is within the WT and WF security zone but loses their connection to the server the alarm may be a simple vibration of the mobile device 10 as it is considered very low risk. Further, if the risk level goes from low to middle or middle to high, a text message, e-mail or phone call may be initiated to the mobile device 10 or to a third party such as a security company or law enforcement. Any combination of these alarms with respect to risk levels could be contemplated in select embodiments. Additionally, the alarm periods can be varied based on the risk level or the type of security zone that is breached.

Alternatively, an additional security action control may be executed in response to the status of a single monitored item. For example, the mobile device 10 may be locked whenever the mobile device 10 is found to be outside a BT zone without any grace period. This security action may be performed irrespective of the current risk level. This enables to lock the mobile device 10 as soon as a user moves away from the mobile device 10.

Figure 8:
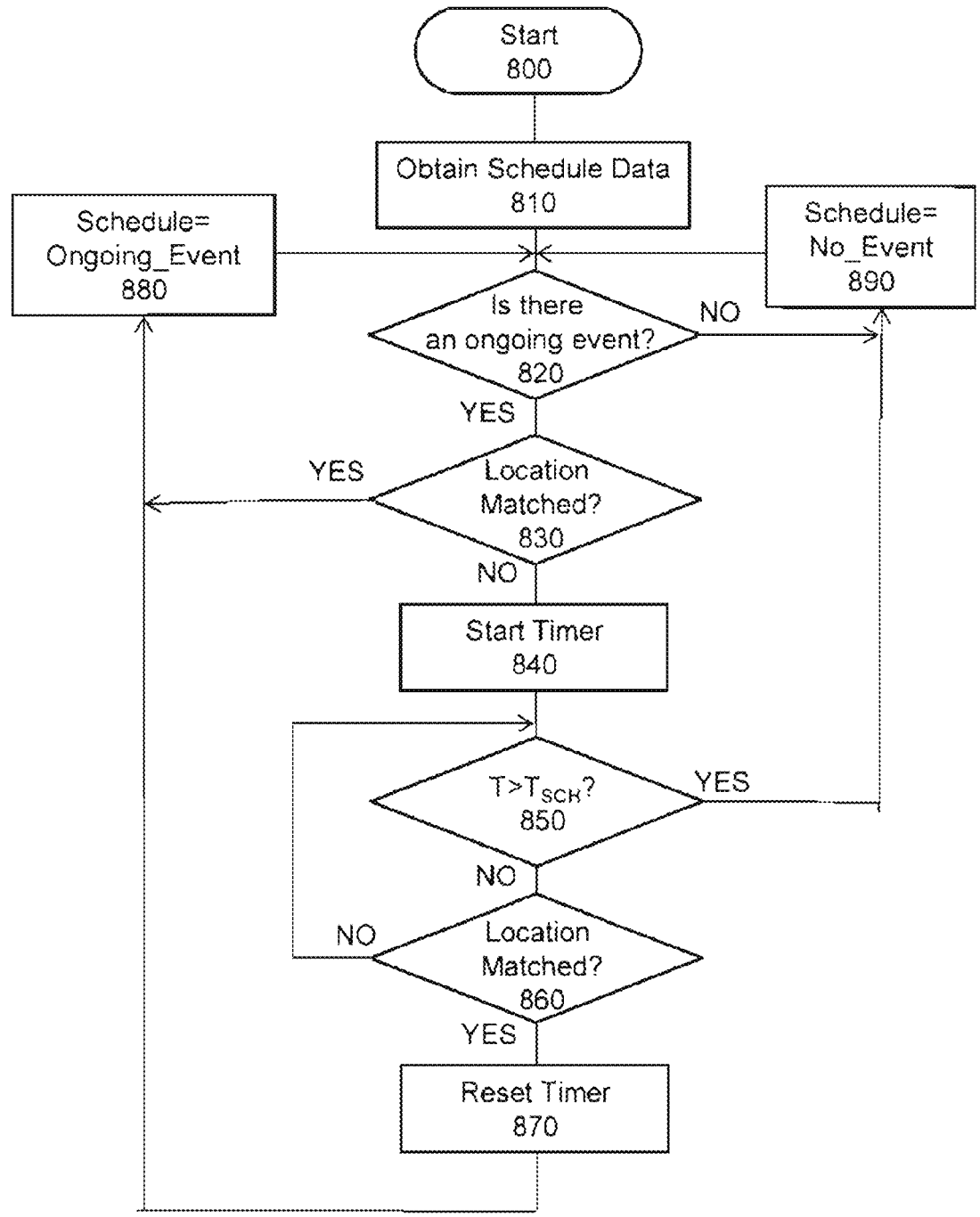
FIG. 8 is an exemplary flowchart of a schedule zone monitoring process for determining presence or absence of a scheduled event.

FIG. 8 is an exemplary flowchart of the schedule monitoring process for determining whether there is an ongoing event, and further determining whether the mobile device 10 is at or near an event location of the ongoing event. The times and places of events are included in the schedule data stored in the scheduler 140 of FIG. 2. The events may include not only special events such as meeting, travel, and the like, but also daily events such as commuting, work, lunch, exercise, and the like. The schedule monitoring process is initiated at step 310 of the control process of FIG. 3.

At step 810, latest schedule data stored in the scheduler 140 or memory of the mobile device 10 is obtained. Here, the schedule data means any data indicative of times and locations of events in which a user plans to participate.

At step 820, the schedule data is searched for an ongoing event. When no ongoing event is found (No at step 820), the process proceeds to step 890 where the value of schedule monitoring result is set as "Schedule=No_event", indicating finding of no ongoing event. Here, "Schedule" is a parameter indicative of the schedule monitoring result, and "No_event" is a value of that parameter. When the new value is set, the corresponding data of the wireless profile table of FIG. 4 is updated. Subsequently, the process returns to step 820 to repeat the monitoring.

When an ongoing event is found (Yes at step 820), the process proceeds to step 830 and determines whether the mobile device 10 is at or near an event location of the ongoing event described in the scheduled data.

FIG. 9 is an example of the event location table stored in the security data memory 220. The event location table lists places where an event may be held and one or more wireless connections available at or near the respective places.

Referring back to FIG. 8, at step 830, the process looks up the event location table of FIG. 9, obtains information for setting up a wireless connection at or near the event location, and controls the BT communication module 110 or the WF communication module 120 to initiate setting up of wireless connection. When the wireless connection is successfully set up, it is determined that the mobile device 10 is at or near the event location (Yes at step 830), and the process proceeds to step 880.

At step 880, the value of schedule monitoring result is set as "Schedule=Ongoing_event", indicating successful finding of ongoing event and matching of the event location. Subsequently, the process returns to step 820 to repeat the monitoring.

When the setting up of wireless connection fails (No at step 830), the process proceeds to step 840 to set a grace period before finalizing the monitoring result. This grace period allows the mobile device 10 to leave the event location temporarily without triggering the security action control. The elapse of the grace period is measured at between step 840 and step 870.

The grace period may be fixed or vary depending on the event location. For example, a larger grace period may be used to give a user more freedom to leave the mobile device 10 when the event location is a meeting room at a building where the user of the mobile device 10 works. On the other hand, a smaller grace period may be used to allow the user to act swiftly when the event location is crowded with people.

At step 840, a timer for measuring a grace period $T_{SCH}$ is started.

At step 850, it is determined if the grace period $T_{SCH}$ ends. If not (No at step 850), the location of the mobile device 10 is checked again at step 860. Steps 850 and 860 are repeated until the grace period $T_{SCH}$ ends (Yes at step 850) or the mobile device 10 returns to the event location (Yes at step 860).

When the grace period $T_{SCH}$ ends (Yes at step 850), the process proceeds to step 890, and the value of schedule monitoring result is set as "Schedule=No_event".

When the mobile device 10 returns to the event location (Yes at step 860), the process proceeds to step 870 where the timer is reset, and to step 880 where the value of schedule monitoring result is set as "Schedule=Ongoing_event".

In FIG. 8, the location matching at steps 830 and 860 is performed by detecting the wireless connection. Alternatively, the location matching may be performed by use of GPS when the mobile device 10 includes a GPS module for detecting its location.

Figure 10:
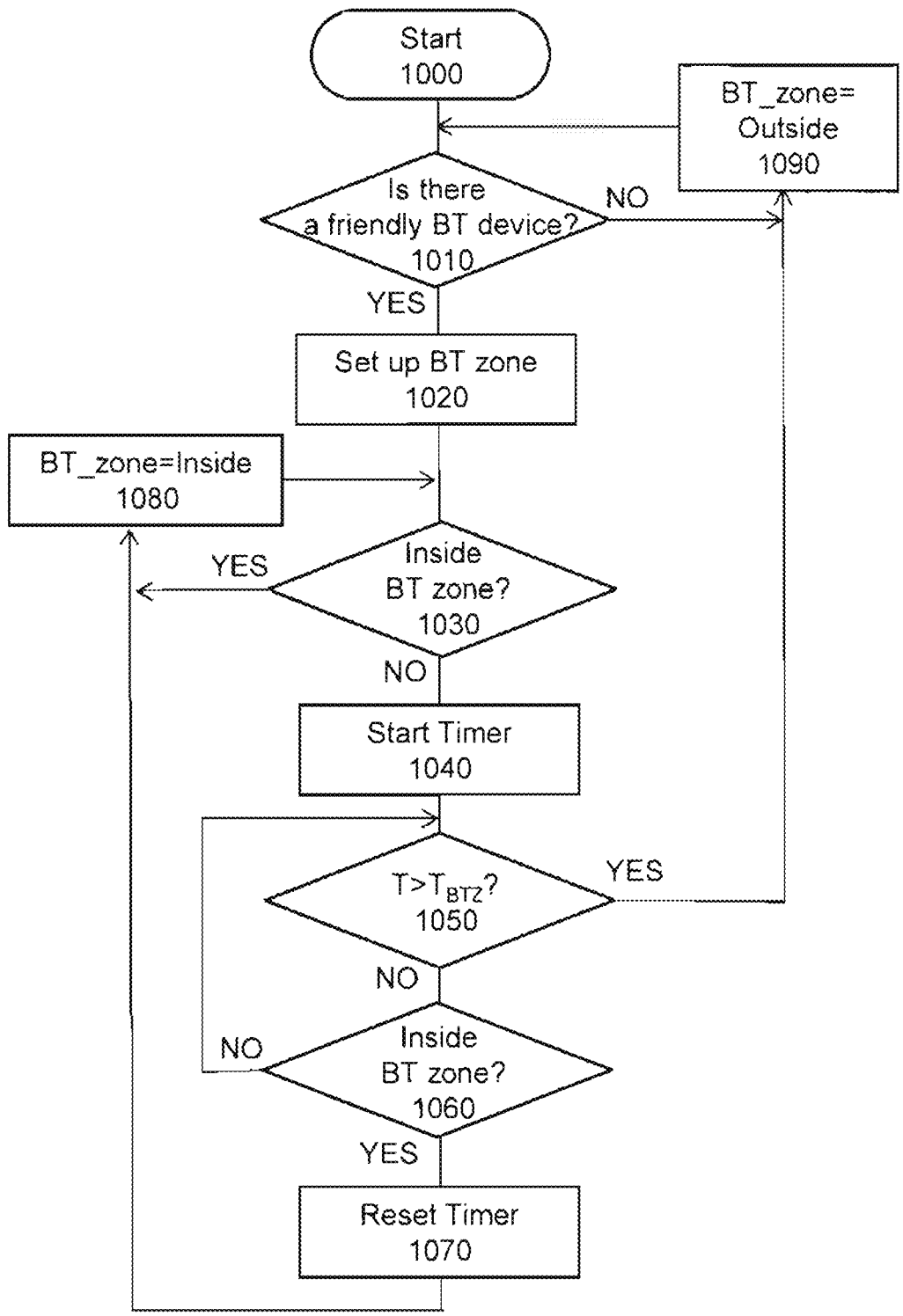
FIG. 10 is an exemplary flowchart of a BT zone monitoring process for determining whether the mobile device is inside or outside a zone which radius corresponds to a maximum communication range of Bluetooth connection.

FIG. 10 is an exemplary flowchart of the BT zone monitoring process for determining whether the mobile device 10 is inside or outside a BT zone established around one of the friendly Bluetooth-enabled devices listed in the friendly device table of FIG. 5. The BT zone monitoring process is initiated at step 310 of the control process of FIG. 3.

At step 1010, the process controls the BT communication module 110 to search a friendly Bluetooth-enabled device. When no friendly Bluetooth-enabled device is discovered (No at step 1010), the process proceeds to step 1090.

At step 1090, the value of BT zone monitoring result is set as "BT_zone=outside", indicating that the mobile device 10 is outside all the BT zones or no friendly device is present nearby. When the new value is set, the corresponding data of the wireless profile table of FIG. 4 is updated. The searching is repeated until a friendly Bluetooth-enabled device is discovered.

When a friendly Bluetooth-enabled device is discovered (Yes at step 1010), the process proceeds to step 1020.

At step 1020, a BT zone is established around the friendly Bluetooth-enabled device discovered.

At step 1030, the process determines whether the mobile device 10 is inside or outside the BT zone by detecting the presence or absence of Bluetooth connection with the friendly Bluetooth-enabled device. When it is determined that the mobile device 10 is inside the BT zone (Yes at step 1030), the process proceeds to step 1080.

At step 1080, the value of BT zone monitoring result is set as "BT_zone=inside", indicating that the mobile device 10 is inside the BT zone established at step 1020.

When it is determined that the mobile device 10 is outside the BT zone (No at step 1030), the process proceeds to step 1040.

At step 1040, a grace period is set before finalizing the monitoring result. This grace period allows the mobile device 10 to leave the BT zone temporarily without triggering the security action control. The elapse of the grace period is measured at between step 1040 and step 1070.

The grace period may be fixed or vary depending on power class of Bluetooth-enabled device or the current risk level. For example, a longer grace period may be used when a smaller BT zone is established around the friendly Bluetooth-enabled device so as to reduce instance of false positive due to accidental stepping out of the BT zone.

At step 1040, a timer for measuring a grace period $T_{BTZ}$ is started.

At step 1050, it is determined if the grace period $T_{BTZ}$ ends. If not (No at step 1050), at step 1060, it is determined again whether the mobile device 10 is inside or outside the BT zone. Steps 1050 and 1060 are repeated until the grace period $T_{BTZ}$ ends (Yes at step 1050) or the mobile device 10 returns to the BT zone (Yes at step 1060).

When the grace period $T_{BTZ}$ ends (Yes at step 1050), the process proceeds to step 1090, and the value of BT zone monitoring result is set as "BT_zone=outside".

When the mobile device 10 returns to the BT zone (Yes at step 1060) before the end of the grace period, the process proceeds to step 1070 where the timer is reset. Subsequently, the process proceeds to step 1080, and the value of BT zone monitoring result is set as "BT_zone=inside".

Figure 11:
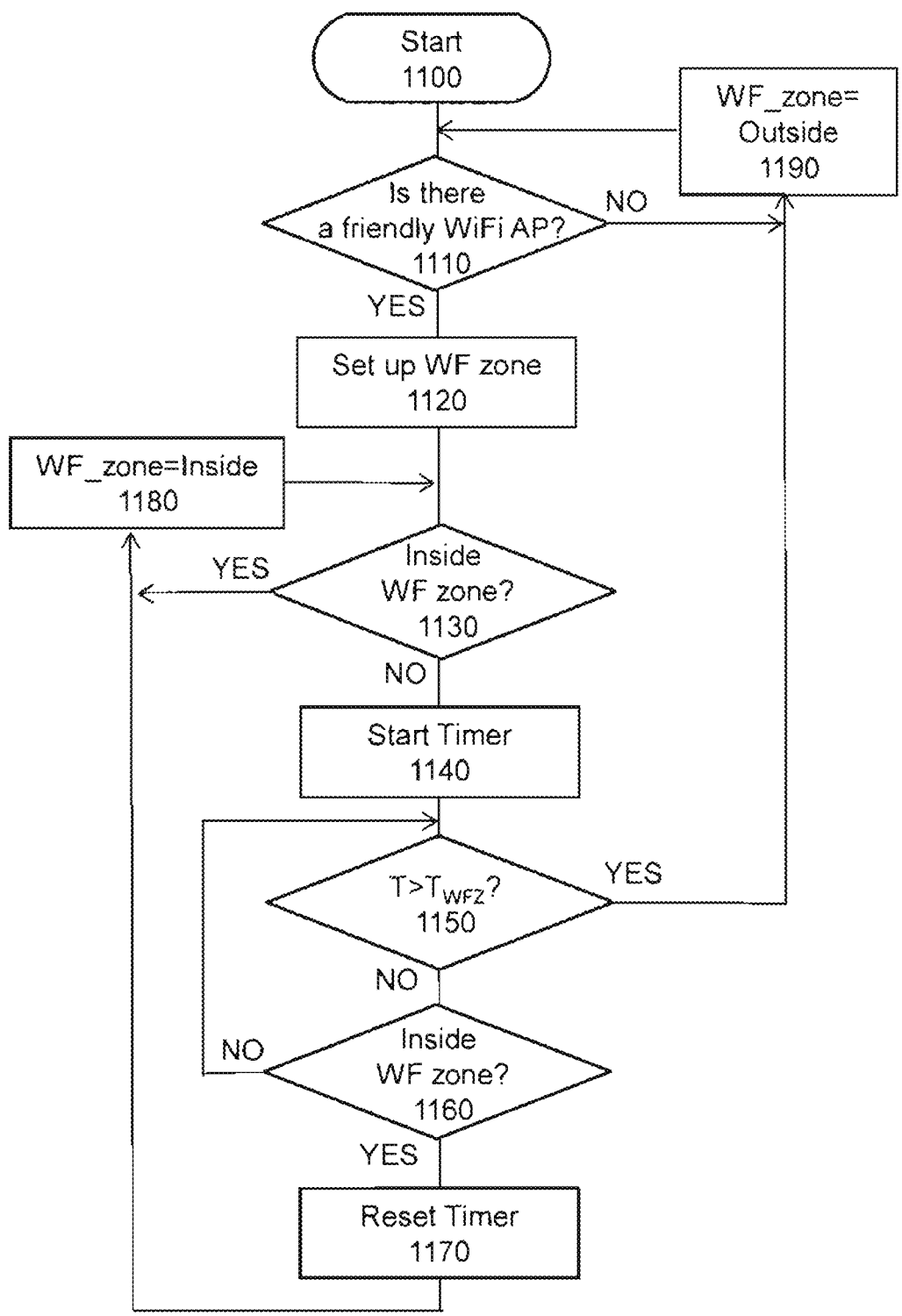
FIG. 11 is an exemplary flowchart of a WF zone monitoring process for determining whether the mobile device is inside or outside a zone which radius corresponds to a maximum communication range of Wi-Fi connection.

FIG. 11 is an exemplary flowchart of the WF zone monitoring process for determining whether the mobile device 10 is inside or outside a WF zone established around one of the friendly Wi-Fi access points listed in the friendly device table of FIG. 5. The WF zone monitoring process is initiated at step 310 of the control process of FIG. 3.

At step 1110, the process controls the WF communication module 120 to search a friendly Wi-Fi access point. When no friendly Wi-Fi access point is discovered (No at step 1110), the process proceeds to step 1190.

At step 1190, the value of WF zone monitoring result is set as "WF_zone=outside", indicating that the mobile device 10 is outside all the WF zones or no friendly Wi-Fi access point is present nearby. When the new value is set, the corresponding data of the wireless profile table of FIG. 4 is updated. The searching is repeated until a friendly Wi-Fi access point is discovered.

When a friendly Wi-Fi access point is discovered (Yes at step 1110), the process proceeds to step 1120.

At step 1120, a WF zone is established around the friendly Wi-Fi access point discovered.

At step 1130, the process determines whether the mobile device 10 is inside or outside the WF zone by detecting the presence or absence of Wi-Fi connection with the friendly Wi-Fi access point. When it is determined that the mobile device 10 is inside the WF zone (Yes at step 1130), the process proceeds to step 1180.

At step 1180, the value of WF zone monitoring result is set as "WF_zone=inside", indicating that the mobile device 10 is inside the WF zone established at step 1120.

When it is determined that the mobile device 10 is outside the WF zone (No at step 1130), the process proceeds to step 1140.

At step 1140, a grace period is set before finalizing the monitoring result. This grace period allows the mobile device 10 to leave the WF zone temporarily without triggering the security action control. The elapse of the grace period is measured at between step 1140 and step 1170.

The grace period may be fixed or vary depending on the Wi-Fi access point. For example, a longer grace period may be used when the Wi-Fi access point is installed at a safer environment. Alternatively, irrespective of the type of wireless connection, the grace period may be set in response to the radius of WF zone. For example, a longer grace period may be set to a smaller WF zone, for there may be a higher chance for the mobile device 10 to move in and out the WF zone.

At step 1140, a timer for measuring a grace period $T_{WFZ}$ is started.

At step 1150, it is determined if the grace period $T_{WFZ}$ ends. If not (No at step 1150), at step 1160, it is determined again whether the mobile device 10 is inside or outside the WF zone. Steps 1150 and 1160 are repeated until the grace period $T_{WFZ}$ ends (Yes at step 1150) or the mobile device 10 returns to the WF zone (Yes at step 1160).

When the grace period $T_{WFZ}$ ends (Yes at step 1150), the process proceeds to step 1190, and the value of WF zone monitoring result is set as "WF_zone=outside".

When the mobile device 10 returns to the WF zone (Yes at step 1160) before the end of the grace period, the process proceeds to step 1170 where the timer is reset. Subsequently, the process proceeds to step 1180, and the value of WT zone monitoring result is set as "BT_zone=inside".

In the present embodiment, determining whether the mobile device 10 is inside the BT zone or the WF zone is performed by detecting the presence or absence of Bluetooth connection or Wi-Fi connection. Alternatively, this determination may be performed by detecting the strength of wireless communication signal. For example, the signal strength from a friendly wireless-enabled device may be measured before setting up the wireless connection, and a security zone is established at an area where the measured signal strength is higher than a preset value. Such a security may be used as the BT zone or the WF zone of the friendly wireless-enabled device.

In some embodiments, interference of wireless communication signals may be measured to evaluate quality of received signals when two or more friendly wireless-enabled devices are discovered. The quality of received signal may be used in selection of one or more of the friendly wireless-enabled devices to be monitored. For example, as the quality of received signal, a signal-to-noise ratio may be measured for Wi-Fi signal, and a received signal strength indicator (RSSI) may be measured for Bluetooth signal.

Many advantages are present in light of the above embodiments whether considered alone or in various combinations. Mobile devices are continuously getting smaller, more expensive and easier to steal or misplace. Accordingly, through the anti-device theft system described herein, a user can feel confident that no matter where he is or what he is doing, there will be a system in place to protect the security of his valuable devices. Multiple layers of protection provide various risk levels and alarm systems that can be preset or set by the user based on their needs to provide a fully customizable protection experience. Further, the layered security approach helps to reduce the risk of false positives from being indicated by the security system which can be extremely disruptive to the user especially in business environments.

Additional power savings and processing savings can be realized by performing the risk level calculations periodically or in response to certain stimuli detected by the mobile device 10 or other devices within the shared-risk network. For example, the security level calculations may only take place when a devices is disconnected from the shared-risk environment or a central node goes down.

Figure 12:
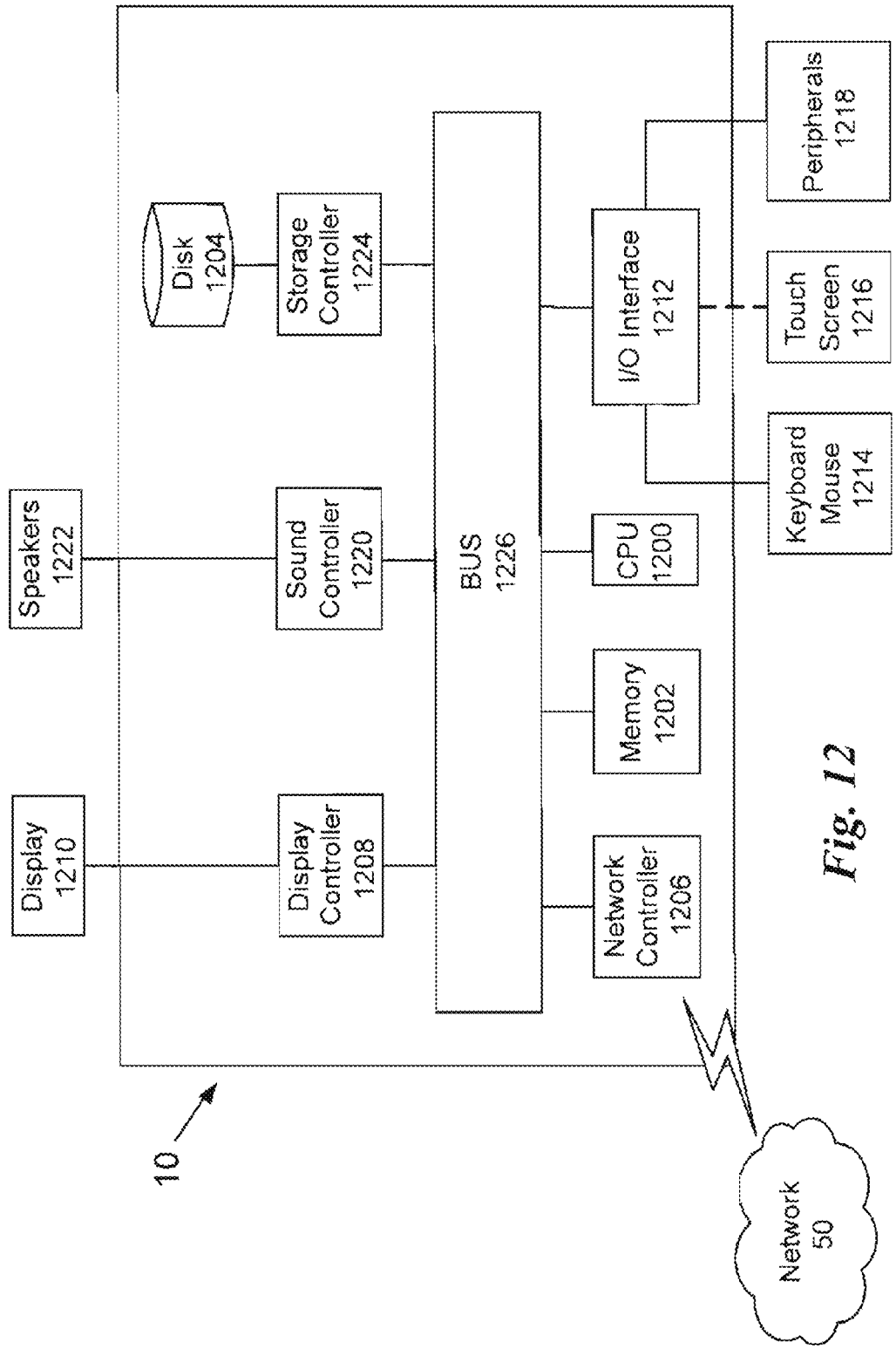
FIG. 12 is a schematic hardware block diagram of the mobile device including a security device according to one embodiment.

Next, a hardware description of the mobile device 10 according to exemplary embodiments is described with reference to FIG. 12. In FIG. 12, the mobile device 10 includes a CPU 1200, which performs the processes described above. The process data and instructions may be stored in memory 1202. These processes and instructions may also be stored on a storage medium disk 1204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the mobile device 10 communicates, such as a server or computer.

Further, the claimed advancements may be provided as a utility application, background daemon, or component of an operating system, or combination thereof, executing in conjunction with CPU 1200 and an operating system such as Microsoft Windows 8, UNIX, Solaris, LINUX, Apple MAC-OS and other systems known to those skilled in the art.

CPU 1200 may be a Xenon or Core processor from Intel of America or an Opteron processor from AMD of America, or may be other processor types that would be recognized by one of ordinary skill in the art. Alternatively, the CPU 1200 may be implemented on an FPGA, ASIC, PLD or using discrete logic circuits, as one of ordinary skill in the art would recognize. Further, CPU 1200 may be implemented as multiple processors cooperatively working in parallel to perform the instructions of the inventive processes described above.

The mobile device in FIG. 12 also includes a network controller 1206, such as an Intel Ethernet PRO network interface card from Intel Corporation of America, for interfacing with network 50. As can be appreciated, the network 50 can be a public network, such as the Internet, or a private network such as an LAN or WAN network, or any combination thereof and can also include PSTN or ISDN sub-networks. The network 50 can also be wired, such as an Ethernet network, or can be wireless such as a cellular network including EDGE, 3G and 4G wireless cellular systems. The wireless network can also be Wi-Fi, Bluetooth, or any other wireless form of communication that is known.

The mobile device 10 further includes a display controller 1208, such as a NVIDIA GeForce GTX or Quadro graphics adaptor from NVIDIA Corporation of America for interfacing with display 1210, such as a Hewlett Packard HPL2445w LCD monitor. A general-purpose I/O interface 1212 interfaces with a keyboard and/or mouse 1214 as well as a touch screen panel 1216 on or separate from display 1210. General-purpose I/O interface also connects to a variety of peripherals 1218 including printers and scanners, such as an OfficeJet or DeskJet from Hewlett Packard.

A sound controller 1220 is also provided in the mobile device 10, such as Sound Blaster X-Fi Titanium from Creative, to interface with speakers/microphone 1222 thereby providing sounds and/or music.

The general purpose storage controller 1224 connects the storage medium disk 1204 with communication bus 1226, which may be an ISA, EISA, VESA, PCI, or similar, for interconnecting all of the components of the mobile device 10. A description of the general features and functionality of the display 1210, keyboard and/or mouse 1214, as well as the display controller 1208, storage controller 1224, network controller 1206, sound controller 1220, and general purpose I/O interface 1212 is omitted herein for brevity as these features are known.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A security device to protect a mobile device against theft or misplacement, the security device comprising:
    memory configured to store
        a friendly device table that: includes information associated with a plurality of wireless-enabled devices, wherein each wireless-enabled device serves as a reference point for the mobile device and has a predetermined secure zone,
        an event location table that includes information associated with a plurality of event locations, wherein each event location is assigned at least one wireless-enabled device that communicates with the mobile device, and
    circuitry: configured to:
        compute a first risk level based on a first location of the mobile device with respect to the predetermined secure zones of the wireless-enabled devices;
        calculate a second risk level based on proximity of the mobile device with respect to at least one event Ideation of the plurality of event locations,
        compute a third risk level based on information obtained from a plurality of sensors disposed on the mobile device,
        compute an overall risk level based on the first risk level, the second risk level, the third risk level, and a predetermined risk-assessment table,
        calculate a change in the overall risk level of the mobile device,
        formulate a shared risk network of the mobile device, the shared risked network representing a plurality of other devices and a corresponding overall risk of each other device of the plurality of other devices, a change in the overall risk of the mobile device causing a change in the overall risk of each of the other devices, and
        perform a type of security action based on the calculated change in the overall risk level of the mobile device, wherein a duration of the performed security action is based on the calculated change in the overall risk level of the mobile device.

2. The security device of claim 1, wherein information associated with each wireless-enabled device included in the friendly device table is determined based on a frequency of detection of the wireless-enabled device by the mobile device.

3. The security device of claim 1, wherein the circuitry is further configured to determine at least one of the first risk level and the second risk level based on one of available battery life of the security device, an amount of processing power of the circuitry, and the computed overall risk level of the mobile device.

4. The security device of claim 3, wherein the circuitry-is further configured to compute the overall risk level of the mobile device as a weighted sum of the first risk level, the second risk level and the third risk level.

5. The security device of claim 4, wherein the overall risk level Is one of a low risk level, low-medium risk level, medium risk level, medium-high risk level and a high risk level.

6. The security device of claim 1, wherein the circuitry is further configured to formulate the shared risk network of the mobile device based on overall risk: level of the mobile device and the overall risk levels of the plurality of other mobile devices.

7. The security device of claim 6 wherein the circuitry is further configured to change the overall risk level of the mobile device based on a change in the overall risk level of at least one mobile device of the plurality of mobile devices.

8. The security device of claim 1, wherein the plurality of sensors include a microphone, an accelerometer, a biosensor, and a temperature sensor.

9. The security device of claim 1, wherein the predetermined security action corresponding to a change in the overall risk level from low overall risk level to medium overall risk level is one of transmitting an alarm and disabling communication features of the mobile device.

10. The security device of claim 1, wherein the predetermined security action corresponding to a change in the overall risk level from one of a low overall risk level and medium overall risk level to high overall risk level is transferring stored information in the mobile device to a back-up storage, and erasing all content stored to the mobile device.

11. A method of protecting a mobile device against theft or misplacement, the method comprising:
    computing by circuitry, a first risk level, based on a first location of the mobile device with respect to a plurality of predetermined secure zones corresponding to a plurality of wireless-enabled devices;
    calculating by the circuitry, a second risk level based on proximity of the mobile device with respect to at least one event location, of a plurality of event locations:
    computing a third risk level based on information obtained from a plurality of sensors disposed on the mobile device;
    computing an overall risk level based on the first risk level, the second risk level, the third risk level, and a predetermined risk-assessment table;
    calculating a change in the overall risk level of the mobile device;
    formulating the shared risked network of the mobile device, the shared risked network representing a plurality of other devices and a corresponding overall risk of each other device of the plurality of other devices, a change in the overall risk of the mobile device causing a change in the overall risk of each of the other devices; and performing a type of security action based on the calculated change in the overall risk level of the mobile device, wherein a duration of the performed security action is based on the calculated change in the overall risk level of the mobile device.

12. The method of claim 11, further comprising:
determining at least one of the first risk level, and the second risk, level based on one of available battery life of the security device, an amount of processing power of the circuitry, and the computed overall risk level of the mobile device.

13. The method of claim 12, further comprising:
computing the overall risk level of the mobile device as a weighted sum of the first risk level, the second risk level and the third risk level.

14. The method of claim 11, further-comprising:
changing the overall risk level of the mobile device based on a change in the overall risk level of at least one mobile device of the plurality of mobile devices.

15. The method of claim 11, wherein the predetermined security action corresponding to a change in the overall risk level from low overall risk level to medium overall risk level is one of transmitting an alarm and disabling communication features of the mobile device.

16. The method of claim 11, wherein the predetermined security action corresponding to a change in the overall risk level from one of a low overall risk level and medium overall risk level to high overall, risk level is transferring stored information in the mobile device to a back-up storage, and erasing ail content stored in the mobile device.

17. A non-transitory computer readable medium having stored thereon a program that when executed by a computer causes the computer to execute a method of protecting a mobile device against theft or misplacement, the method comprising:
computing by circuitry, a first risk level based on a first location of the mobile device with respect to a plurality of predetermined secure zones corresponding to a plurality of wireless-enabled devices;
calculating by the circuitry, a second risk level based on proximity of the mobile device with respect to at least one event location of a plurality of event locations;
computing a third risk level based on information obtained from a plurality of sensors disposed-on the mobile device;
computing an overall risk level based on the first risk level, the second risk level, the third risk level, and a predetermined risk-assessment table;
calculating a change in the overall risk level of die mobile device;
formulating a shared risk network of the mobile device; the shared risked network representing a plurality of other devices and a corresponding overall risk of each other device of the plurality of other devices, a change in the overall risk of the mobile device causing a change in the overall risk of each of the other devices, and
performing a type of security action based on the calculated change in the overall risk level of the mobile device, wherein a duration of the performed security action is based on the calculated change in the overall risk level of the mobile device.

18. The non-transitory computer readable medium of claim 17, further comprising:
determining at least one of the first risk level and the second risk level based on one of available battery life of the security device, an amount of processing power of the circuitry, and the computed overall risk level of the mobile device.

19. The non-transitory computer readable medium of claim 17, wherein the predetermined security action corresponding to a change in the overall risk level from low overall risk level to medium overall risk level is one of transmitting an alarm and disabling communication features of the mobile device.

20. The non-transitory computer readable medium of claim 17, wherein the predetermined security action corresponding to a change in the overall risk level from one of a low overall risk level and medium overall risk level to high overall risk level is transferring stored information in the mobile device to a back-up storage, and erasing all content stored in the mobile device.

* * * * *